(12) United States Patent
Gogo

(10) Patent No.: US 7,691,019 B2
(45) Date of Patent: Apr. 6, 2010

(54) CHAIN GUIDE

(75) Inventor: Kazuhiko Gogo, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 854 days.

(21) Appl. No.: 10/891,839

(22) Filed: Jul. 15, 2004

(65) Prior Publication Data

US 2005/0159260 A1 Jul. 21, 2005

(30) Foreign Application Priority Data

Aug. 29, 2003 (JP) .............................. 2003-307343

(51) Int. Cl.
*F16H 7/18* (2006.01)
*F16H 57/02* (2006.01)

(52) U.S. Cl. .................... 474/140; 474/111; 474/144

(58) Field of Classification Search .................. None
See application file for complete search history.

(56) References Cited

U.S. PATENT DOCUMENTS

| | | | | |
|---|---|---|---|---|
| 3,885,471 A | * | 5/1975 | Morine et al. | 474/144 |
| 4,158,402 A | * | 6/1979 | Romans | 184/15.1 |
| 4,471,851 A | * | 9/1984 | Kamiya et al. | 180/219 |
| 4,733,741 A | * | 3/1988 | Swanson | 180/219 |
| 5,679,084 A | * | 10/1997 | Daniels, III | 474/140 |
| 6,435,994 B1 | * | 8/2002 | Friedmann et al. | 474/145 |
| D532,720 S | * | 11/2006 | McGarry | D12/127 |
| 2002/0160869 A1 | * | 10/2002 | Barnett | 474/144 |
| 2003/0144099 A1 | * | 7/2003 | Horie et al. | 474/111 |
| 2003/0224891 A1 | * | 12/2003 | Chou | 474/146 |
| 2004/0092351 A1 | * | 5/2004 | Bergman | 474/140 |
| 2004/0214672 A1 | * | 10/2004 | Thomas et al. | 474/111 |
| 2007/0087877 A1 | * | 4/2007 | McGarry | 474/144 |

FOREIGN PATENT DOCUMENTS

| | | |
|---|---|---|
| JP | 58178043 | 10/1983 |
| JP | 3-2952 | 1/1991 |
| JP | 3-5588 | 1/1991 |
| JP | UM-B-5-20637 | 5/1993 |
| JP | 5193549 | 8/1993 |
| JP | 2002120786 A * | 4/2002 |

* cited by examiner

*Primary Examiner*—Bradley T King
*Assistant Examiner*—Thomas Irvin
(74) *Attorney, Agent, or Firm*—Carrier, Blackman & Associates, P.C.; Joseph P. Carrier; William D. Blackman

(57) ABSTRACT

A chain guide, including a chain guide member and a guide holder, in which deformation and/or scarring of the guide holder can be controlled, and which is easy to assemble and disassemble, is described. The position of a front end of the guide holder is brought in contact with a flange provided at the front end of the chain guide member. Left and right side surfaces of the chain guide member are formed on the backside of the flange. The leading edge of the front end of the guide holder abuts and confronts the left and right side surface of the backside of the flange of the chain guide member so that a chain entering the chain guide contacts the chain guide member rather than the guide holder. A method of manufacturing the guide holder is presented.

23 Claims, 6 Drawing Sheets

PRIOR ART

CHAIN GUIDE

CROSS-REFERENCE TO RELATED APPLICATIONS

The present invention claims priority under 35 USC 119 based on Japanese patent application No. 2003-307343, filed Aug. 29, 2003.

BACKGROUND OF THE INVENTION

1. Field of the Invention

The present invention relates to a chain guide for a motorcycle, which is useful for preventing a drive chain from coming off a sprocket on the motorcycle's rear wheel due to a swinging motion of a rear swing arm.

2. Description of the Background Art

Certain chain guides for motorcycle drive chains have been known. For example, a chain guide has been provided at the rear portion of the a motorcycle's rear swing arm, for preventing a chain from coming off a sprocket due to vibrations of the rear swing arm or the like under harsh traveling conditions. There is an increased risk of the chain coming off the sprocket where the vertical amplitude of vibrations of the rear swing arm becomes significantly large.

However, during travel, the known chain guide is adapted to be contacted by the moving chain at the position of installation thereof. Therefore, abrasion of the chain guide is a problem with the known designs.

A chain guide which is formed of plastic resin, with an attached guide holder to increase the strength and the rigidity thereof, is proposed in Japanese published Patent Document JP-UM-B-5-20637.

FIGS. 7 and 8 of the drawings in the present document are reproductions of FIG. 4 and FIG. 2, respectively, from Japanese published Patent Document JP-UM-B-5-20637. However, components of FIGS. 7 and 8 hereof have been renumbered from the original, and the names of the components are partly changed.

In the prior art chain guide 100 from Japanese published Patent Document JP-UM-B-5-20637, as illustrated in FIGS. 7-8, the chain guide 100 includes a guide holder 101 formed of a metal such as aluminum, and having a substantially U-shape in cross-section. The chain guide 100 also includes a chain guide member 102 formed of plastic resin or the like for fitting inside of the guide holder 101. The chain guide 100 is attached to the lower rear surface 107 of the rear swing arm 106 via a mounting stay 108.

During operation of the motorcycle, the chain 109 is adapted to be contacted by the moving chain guide member 102. When these components come into contact many times, abrasion of the chain guide member 102 results. At a chain-introducing portion 105 of the chain guide 100, the chain guide member 102 is subjected to a large amount of abrasion.

Once the chain guide member has become abraded, since the chain guide member 102 and the guide holder 101 are oriented flush with each other on the side surface of the introducing portion, the chain 109 may come into contact with the guide holder 101, in association with a swinging motion of the rear swing arm 106. When durability is considered, it would be best to avoid interaction between the guide holder 101 and the chain 109, since these components are both formed of metal. When it is found that these metal components come into contact after a certain amount of usage, replacement of the device with a larger chain guide, or increased costs are likely.

Also, when the guide holder 101 becomes s deformed or scarred due to contact or the like between the guide holder and the chain, it takes time for replacement thereof, and during this time, the vehicle becomes temporarily unusable. In the case of off-road motorcycle racing, for example, it may affect the result of the race. Therefore, easy assembly and disassembly of the guide holder are desired.

Although the known motorcycle chain guides are useful for their intended purposes, there is still a need for an improved chain guide, designed to minimize contact between a guide holder and a motorcycle chain during use. It would be advantageous if such a chain guide were easy to maintain and service.

SUMMARY OF THE INVENTION

It is an object of the present invention to provide a chain guide including a guide holder in which deformation and scarring of the guide holder is minimized by design.

It is another object of the present invention to provide a chain guide which can be assembled and disassembled easily.

The present invention, according to a first aspect hereof, provides a chain guide including a chain guide member, formed of tough, durable material, where the chain guide member is designed to come into contact with a moving chain during use. The chain guide hereof also includes a guide holder for supportively holding the chain guide member, wherein the guide holder is mountable to the swing arm. In the chain guide according to the first aspect hereof, an enlarged flange is provided at a front end of the chain guide member, and a cutout portion is formed in a front end portion of the guide holder. In use, the front end portion of the guide holder is retained behind the chain guide member by the flange at the front of the chain guide member.

The flange is provided at the front end of the chain guide member where the chain is introduced, and the front end portion of the guide holder is brought in contact with the flange.

The flange at the front end of the chain guide member is adapted to shield the front end of the guide holder from contacting the chain. Accordingly, the chain is adapted to be contacted by the moving chain guide member, and does not come into direct contact with the front end of the guide holder. In other words, the chain guide member absorbs the impact generated by contact of the chain.

During off-road traveling on rough, uneven ground, interference between the guide holder and the surface of the ground may occur. (In the prior art, since the guide holder and the surface of the ground could potentially interfere directly with each other, scarring and/or deformation of the guide holder could occur.) According to the first aspect of the present invention, in a situation where the chain guide contacts the ground surface, it will be the non-metal chain guide member which makes such contact, since the front end of the chain guide is defined by the chain guide member, and therefore, scarring and/or deformation of the guide holder is minimized or avoided.

Consequently, a lightweight and compact chain and guide holder can be formed, and in addition, occurrence of scarring and/or deformation of the guide holder due to contact with the chain can be reduced or eliminated. Furthermore, since the occurrence of scarring on the guide holder is reduced, frequency of maintenance such as repair and/or replacement of the guide holder may be reduced.

The present invention, according to a second embodiment hereof, is characterized in that the guide holder is formed such that the lower ends of the left and right walls thereof bend inwardly and are connected at the bottom, so as to be formed into a modified trough having a U-shape as viewed in cross-section, with the left and right walls tapered downwardly.

Since the guide holder is formed substantially into the cross-sectional U-shape with the left and right walls tapered downwardly, the possibility of reception of impact from below or from sides by, for example, stones or obstacles, may be reduced. As a consequence, the possibility of deformation and breakage of the guide holder or of the mounting stay may be reduced.

The present invention, according to a third embodiment hereof, is further characterized in that the guide holder is formed from an extruded tubular member made of an aluminum alloy. In other words, the guide holder can be formed by cutting and machining only, and thus a pressing process is not necessary. Since an extruded member of an aluminum alloy is used, the portion which requires machining is small, and simultaneously, dimensional accuracy is achieved, which is higher than the accuracy which can be obtained by stamping or press processing.

Consequently, the chain guide member can be positioned accurately with respect to the guide holder and assembled easily.

By using the extruded member of aluminum alloy, required processes are cutting and machining only, and many processes including heat processing or pressing, as in the related art, are not necessary. Since a die for stamping or press processing is not necessary, it is advantageous in terms of cost, particularly when manufacturing few components.

The present invention, according to a fourth embodiment hereof, is characterized in that the guide holder is formed in a modified trough shape with a substantially U-shaped cross-section, by dividing a hollow extruded tubular member, having a substantially rectangular cross-sectional shape, into two parts.

Since the guide holder is obtained by dividing a hollow extruded tubular member of substantially rectangular cross-sectional shape into two parts, the cross-sectional shape, in particular, the dimensional accuracy in the direction of width of the extruded tubular member can be utilized as is. As a result, a predetermined dimensional accuracy of the guide holder can be easily and reliably secured.

Also, since the guide holder is formed by using an extruded tubular member of substantially rectangular cross-sectional shape, the packed state for transportation is stable in comparison with material of irregular cross-sectional shape, and thus the possibility of collapse of cargo piles can be reduced.

As a further consequence of the guide holder shape, the chain guide member can be positioned accurately and assembled easily with respect to the guide holder.

The present invention, according to a fifth embodiment hereof, is characterized in that the left and right walls and the bottom portion extending between these walls of guide holder are configured in such a manner that the bottom portion is thinner than either of the left and right walls.

Since the guide holder is formed from the extruded tubular member, the bottom portion can be made thinner than either of the left and right walls. By forming the bottom portion of the guide holder to be thinner than either of the left and right walls, which corresponds to the stay mounting portion, the strength of the stay mounting portion is maintained, while reducing the weight of the guide holder.

The present invention, according to a sixth embodiment hereof, provides a chain guide including a chain guide member which is adapted to be contacted by the moving chain, and a guide holder for holding the chain guide member. When installed on a vehicle, the guide holder is mounted to the swing arm. The sixth embodiment of the chain guide hereof is characterized in that the guide holder is formed in a modified trough shape with a substantially U-shaped cross-section, by dividing an extruded tubular member of substantially rectangular cross-sectional shape into two parts.

Since the guide holder is obtained by dividing an extruded tubular member having a substantially rectangular cross-sectional shape into two parts, the cross-sectional shape, in particular, the dimensional accuracy in the direction of width of the extruded member can be utilized as is, and thus a predetermined dimensional accuracy required by the guide holder can be secured easily and reliably.

Also, since the guide holder is formed from an extruded tubular member of substantially rectangular cross-sectional shape, the packed state for transportation is stable in comparison with material of irregular cross-sectional shape, and thus the possibility of collapse of cargo piles can be reduced.

As a consequence, the chain guide member can be positioned accurately and assembled easily with respect to the guide holder.

The present invention, according to a seventh embodiment hereof, is characterized in that the left and right walls and the bottom portion connecting the lower ends of these walls, constituting the guide holder, are formed in such a manner that the bottom portion is thinner than either of the left and right walls.

Since the guide holder is formed from the extruded member, the bottom portion can be easily made thinner than either of the left and right walls. By forming the bottom portion of the guide holder to be thinner than either of the left and right walls, which corresponds to the stay mounting portion, the strength of the stay mounting portion is maintained, while reducing the overall weight of the guide holder.

According to the first aspect of the present invention, since scarring of the guide holder due to contact with the chain is reduced or eliminated, frequency of maintenance of the guide holder can advantageously be reduced.

According to the second aspect of the present invention, since the guide holder is formed in a modified trough shape with a substantially U-shaped cross-section in which the left and right walls are tapered downward, deformation and damages of the guide holder or the mounting stay can be advantageously reduced.

According to the third aspect of the present invention, since an extruded member of aluminum alloy is used, the amount of machining may be less than when a method of cutting out a guide holder from a plate member is employed. Since machining is employed to form the guide holder, the guide holder is advantageously obtained with a high degree of accuracy.

According to the fourth aspect of the present invention, since the predetermined dimensional accuracy of the guide holder can be secured easily and reliably by forming it in a modified trough shape with a substantially U-shaped cross-section by dividing a hollow extruded tubular member of substantially rectangular cross-sectional shape into two parts, the chain guide member can advantageously be positioned accurately in the guide holder, and the chain guide can be assembled easily.

According to the fifth aspect of the present invention, since the bottom portion of the guide holder is formed to be thinner than either of the left and right walls, the weight of the guide holder can advantageously be reduced while maintaining the strength of the side walls.

According to the sixth aspect of the present invention, since the predetermined dimensional accuracy of the guide holder can be secured easily and reliably by forming it in a modified trough shape with a substantially U-shaped cross-section as a result of dividing the hollow, extruded tubular member of substantially rectangular cross-sectional shape into two parts, the chain guide member can be positioned accurately and assembled easily with respect to the guide holder.

According to the seventh aspect of the present invention, since the bottom portion of the guide holder is formed to be thinner than either of the left and right walls, the weight of the guide holder can advantageously be reduced, while maintaining the strength of the side walls.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION

Referring now to the attached drawings, a number of presently contemplated embodiments hereof will be described, including the best mode for carrying out the invention.

Figure 1:
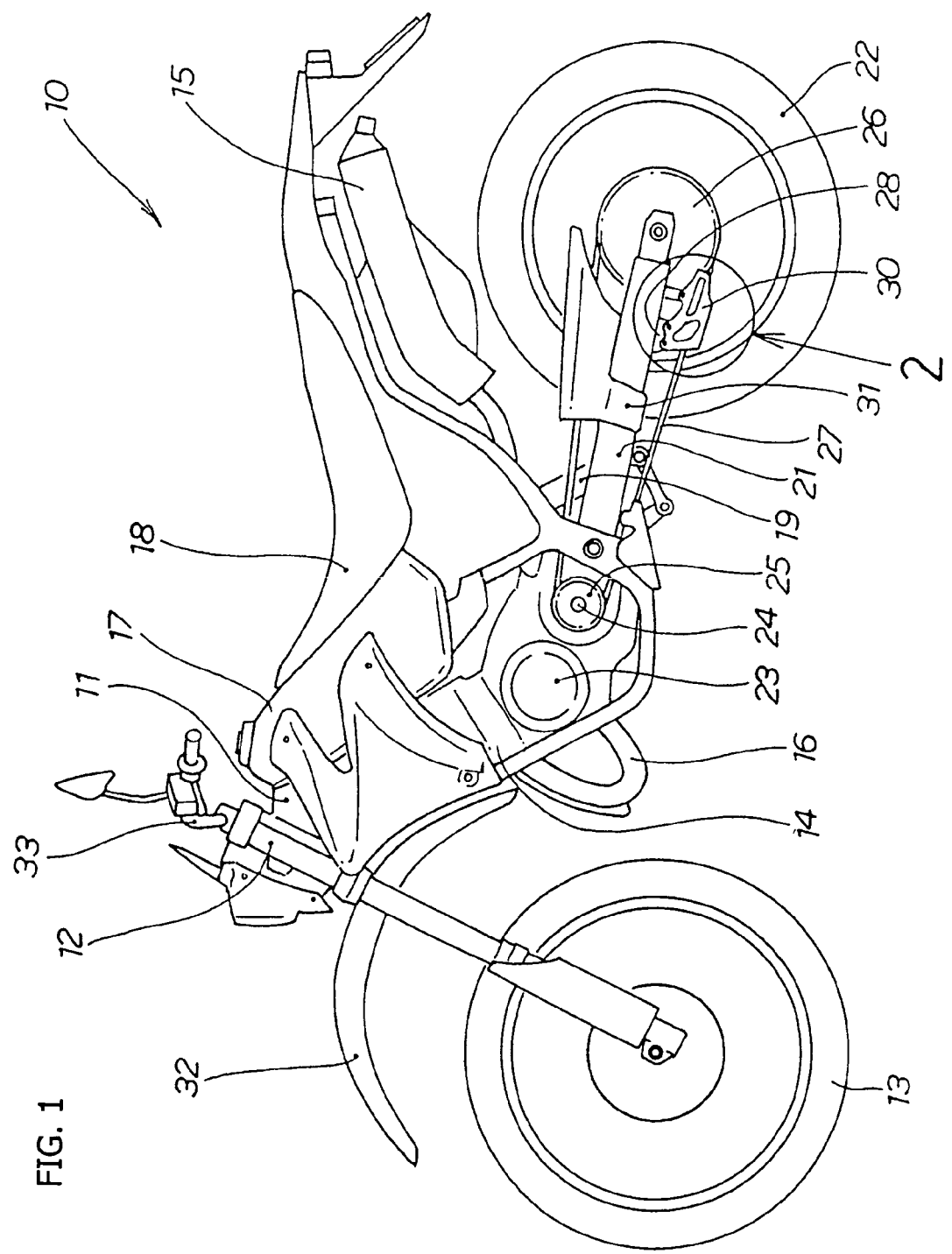
FIG. 1 is a side view of an off-road type motorcycle to which the present invention is applied.

FIG. 1 is a side view of an off-road type motorcycle to which the present invention is applied. The motorcycle 10 includes a main frame 11, a front fork 12 steerably attached at the front of the main frame 11, and a front wheel 13 attached to the lower end of the front fork 12. The motorcycle 10 also includes an engine 14 suspended from the main frame 11, and an exhaust pipe 16 extending rearwardly from the engine, for flowing exhaust gas discharged from the engine 14 to a muffler 15. The motorcycle 10 further includes a fuel tank 17 and a rider's seat 18 disposed on the main frame 11 from the front to the rear. The motorcycle 10 also includes a swing arm 21 pivotally attached to the rear of the main frame 11 via a rear cushion 19 so as to be capable of a reciprocating vertical movement, and a rear wheel 22 attached to the back end of the swing arm 21.

A power transmission system is provided for moving the motorcycle 10, and mainly includes the engine 14, a transmission 23 provided below the engine 14, a drive gear 25 attached to an output shaft 24 of the transmission 23, a sprocket 26 attached to the rear wheel 22, and a chain 27. The chain 27 is an endless chain loop wound around the sprocket 26 and the drive gear 25.

A chain guide 30 according to the present invention is also provided on the motorcycle 10, attached to the lower surface of the rear portion of the swing arm 21, so as to be capable of vertical movement via a mounting stay 28.

In the drawings, reference numeral 31 designates a chain cover, reference numeral 32 designates a front fender, and reference numeral 33 designates a handlebar.

It will be apparent from a review of FIG. 1 that during forward movement of the motorcycle 10, the rear wheel 22 will rotate in a counter-clockwise direction as viewed in the drawing. Accordingly, due to this counterclockwise direction of wheel rotation, the drive gear 25 and sprocket 26 will each also move in the counter-clockwise direction during forward movement, since the sprocket 26 is affixed to the wheel 22, and the drive gear 25 is connected to the sprocket via the chain 27. Therefore, due to both sprockets moving in this way, it is clear that the lower portion of the chain 27 will move in a rearward direction during normal vehicle operation under power, as shown by the arrow A in FIG. 2. The chain guide 30 surrounds an area at the lower portion of the chain 27, which is wound around the sprocket 26. Since the lower part of the chain 27 moves rearwardly, and the chain guide surrounds a lower part of the chain, it will be seen that the front end of the chain guide 30 defines a chain-receiving end where the chain first enters the chain guide. The chain guide 30 prevents the chain 27 from coming off the sprocket 26 during vertical movement of the swing arm 21. The chain guide 30 also controls deflection of the chain 27, so that it does not exceed a predetermined extent. In other words, its function is to guide the chain 27, and prevent it from coming off the sprocket 26, by controlling deflection of the chain 27.

Figure 2:
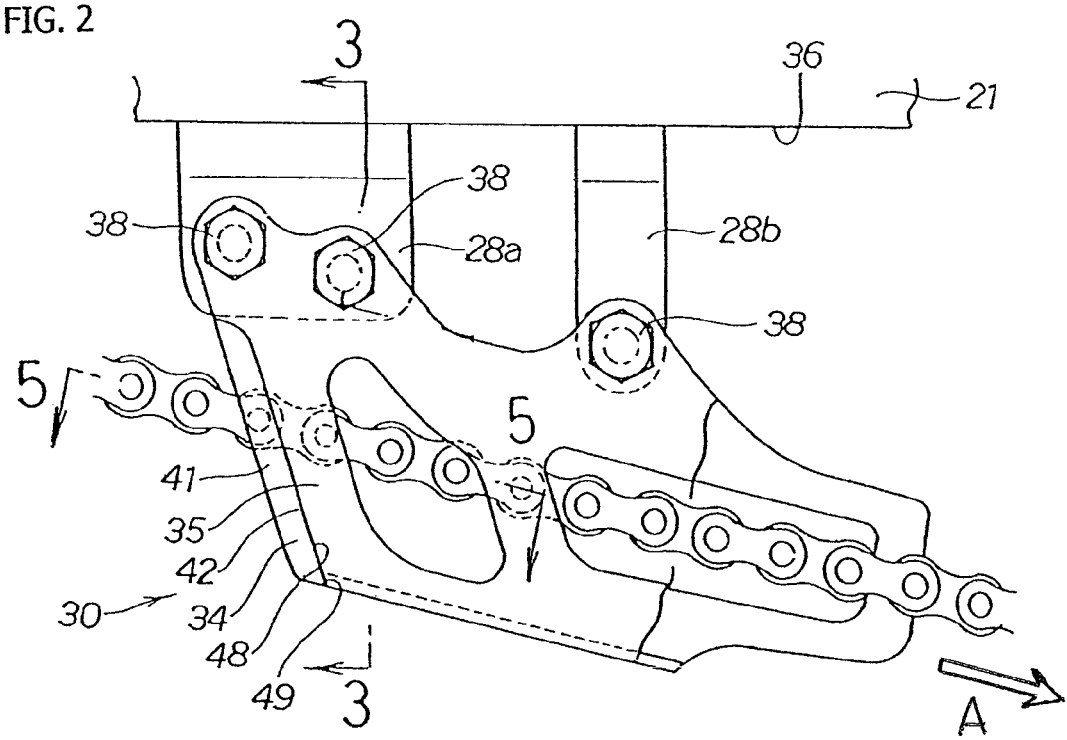
FIG. 2 is an enlarged side detail view of a portion designated within a circle 2 of FIG. 1, illustrating the inventive chain guide, including a chain guide member and guide holder, mounted to a swing arm of an off-road type motorcycle.

FIG. 2 is an enlarged detail view of the chain guide hereof, taken in a portion indicated inside of a circle 2 in FIG. 1. The chain guide 30 includes a chain guide member 34 formed of resilient, abrasion-resistant material such as a polyurethane elastomer. The chain guide 30 also includes a guide holder 35, formed of high-strength aluminum alloy. The guide holder 35 substantially surrounds and encloses the chain guide member 34, as shown. Mounting stays 28a, 28b are mounted to the lower surface 36 of the swing arm, and the chain guide member 34 and the guide holder 35 are each respectively fixed to the stays 28a, 28b via bolts 38 and nuts 39 (FIG. 3).

Figure 4:
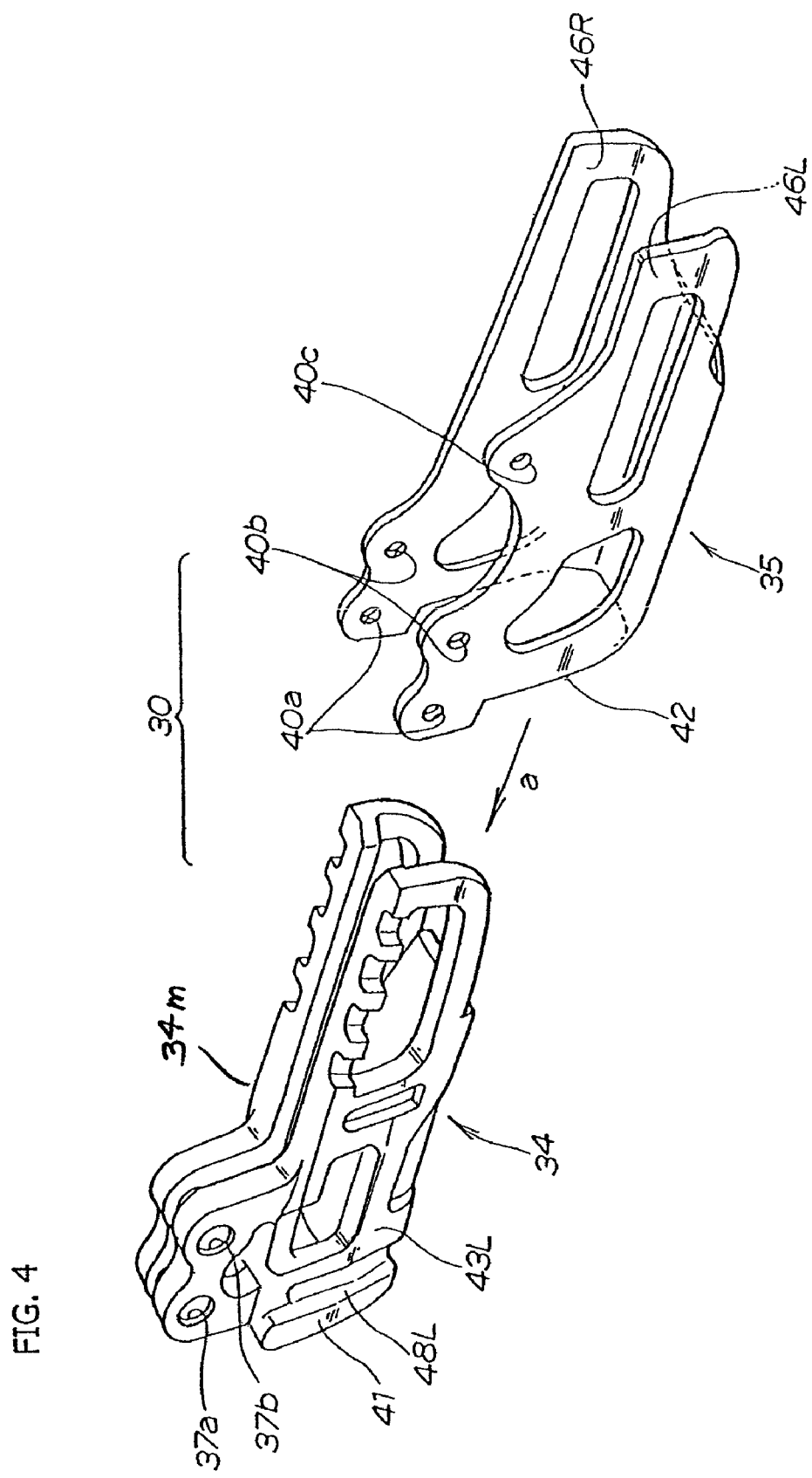
FIG. 4 is an exploded perspective view of a chain guide according to the present invention.
Figure 5:
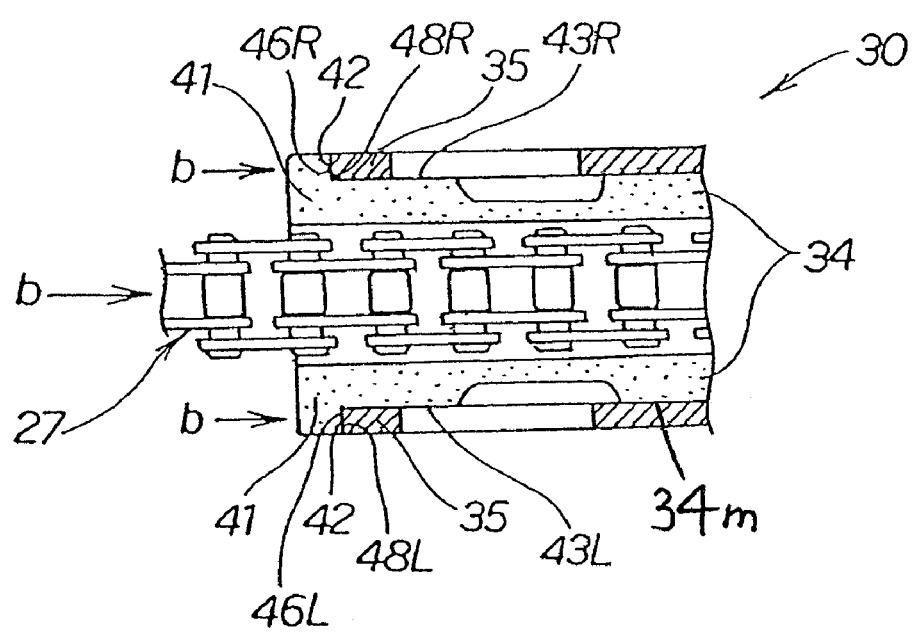
FIG. 5 is a cross-sectional view of the assembled chain guide, taken along the line 5-5 in FIG. 2.
Figure 6A:
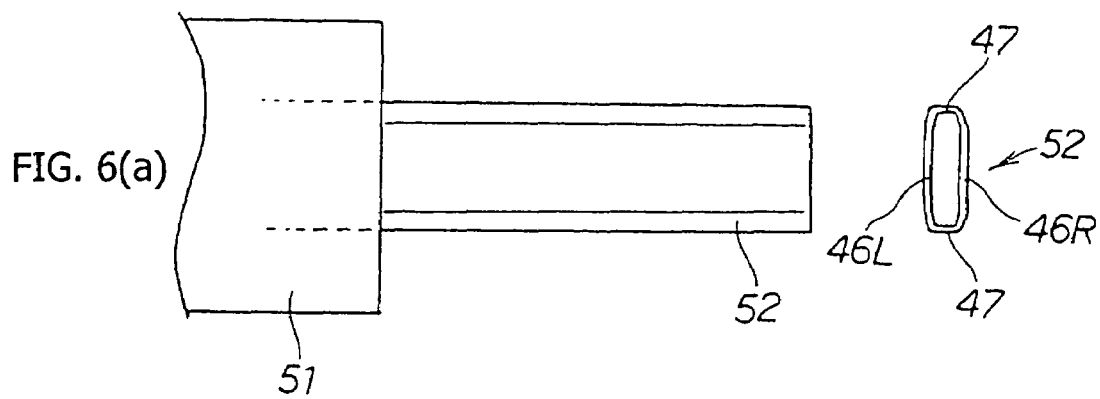
FIG. 6 illustrates a series of manufacturing steps for forming a guide holder according to a method of the present invention.
Figure 6B:
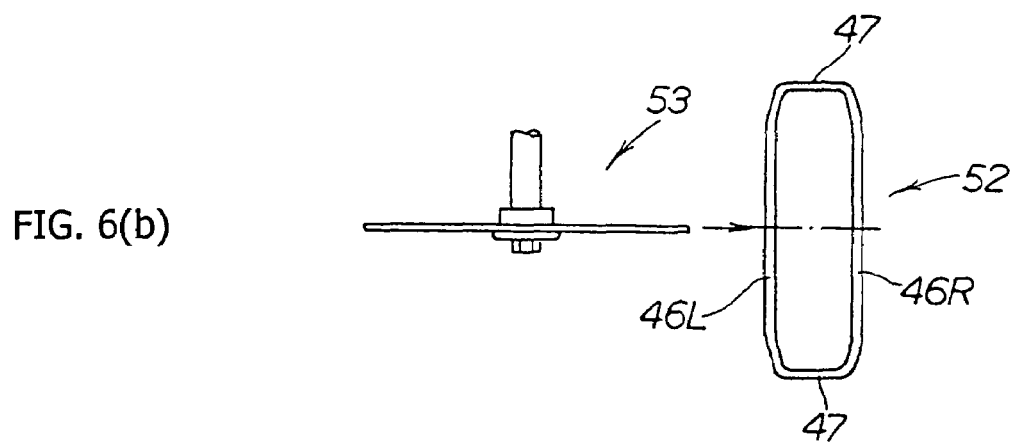
Figure 6C:
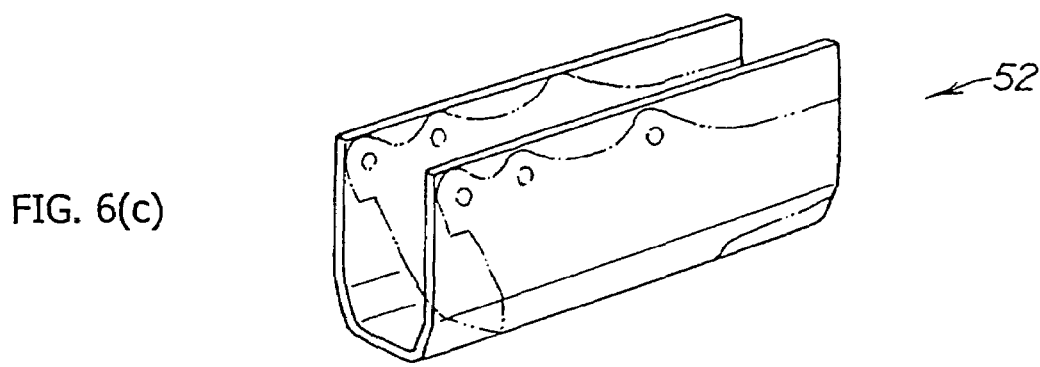
Figure 6D:
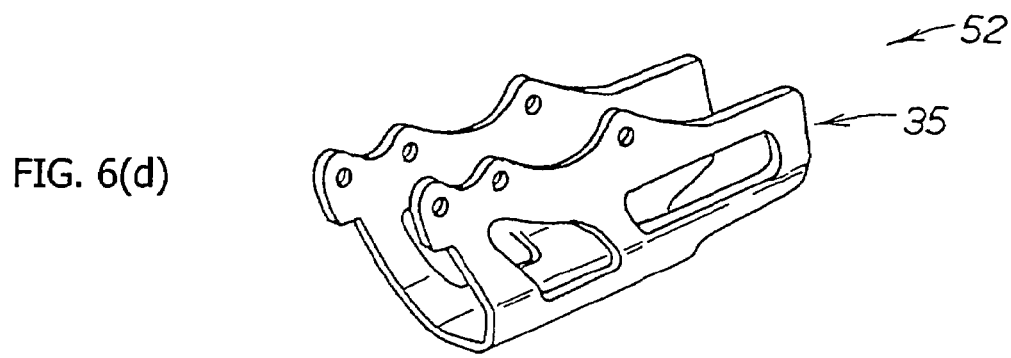
Figure 7:
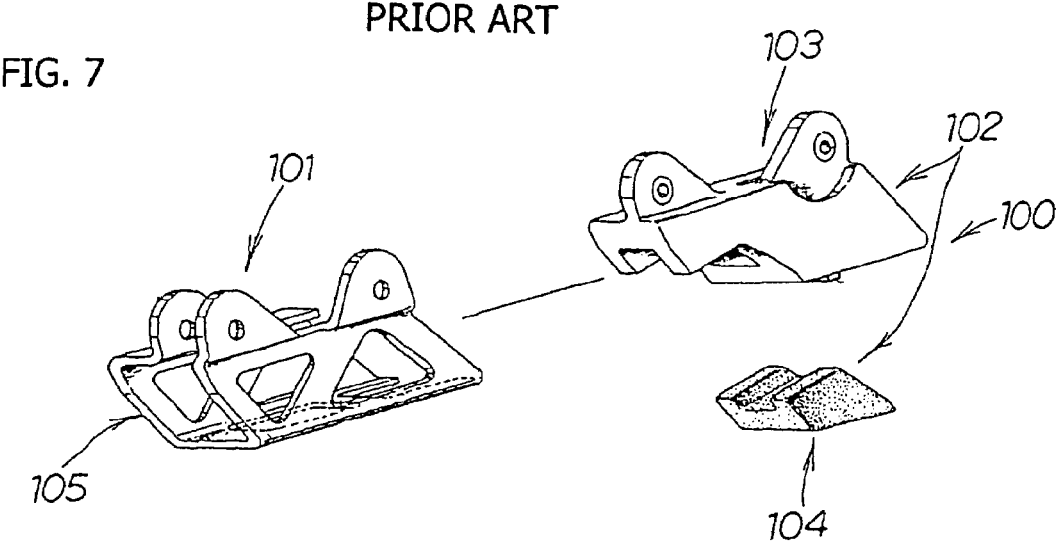
FIG. 7 is an exploded view drawing from FIG. 4 in Patent Document JP-UM-B-5-20637 illustrating a prior art chain guide, including a chain guide member and guide holder.
Figure 8:
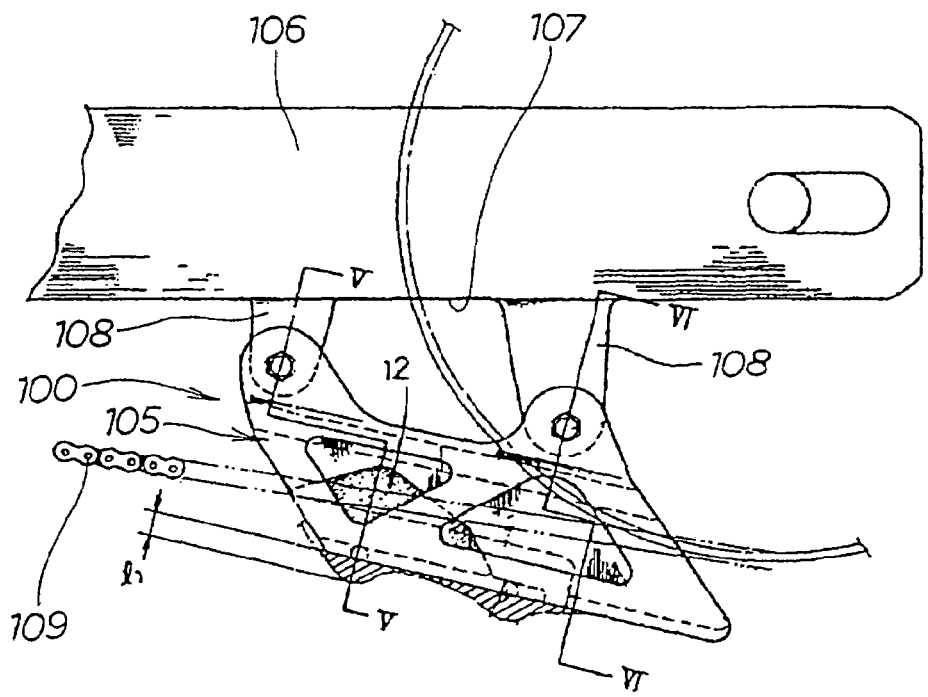
FIG. 8 is an assembled view drawing from FIG. 2 in Patent Document JP-UM-B-5-20637 illustrating a prior art chain guide, including a chain guide member and guide holder, mounted to a swing arm.

The chain guide member 34 includes a medial portion 34m having a first width extending between opposed side walls 46L, 46R thereof. An enlarged flange 41 is provided at the front end of the chain guide member 34 forward of the medial portion 34m, and the flange 41 is disposed so as to protrude forwardly from the front end 42 of the guide holder 35. As seen in FIGS. 4 and 5, the flange 41 is wider than the medial portion 34m of the chain guide member on both sides thereof. Due to its width, the flange 41 functions as a stop member to limit rearward movement of the chain guide member 34 in the guide holder 35. It will be understood that, due to its increased width and location in front of the guide holder 35, the flange 42 shields the front end of the guide holder 35, and tends to prevent or limit contact between the chain 27 and the guide holder 35 during vehicle operation.

Figure 3:
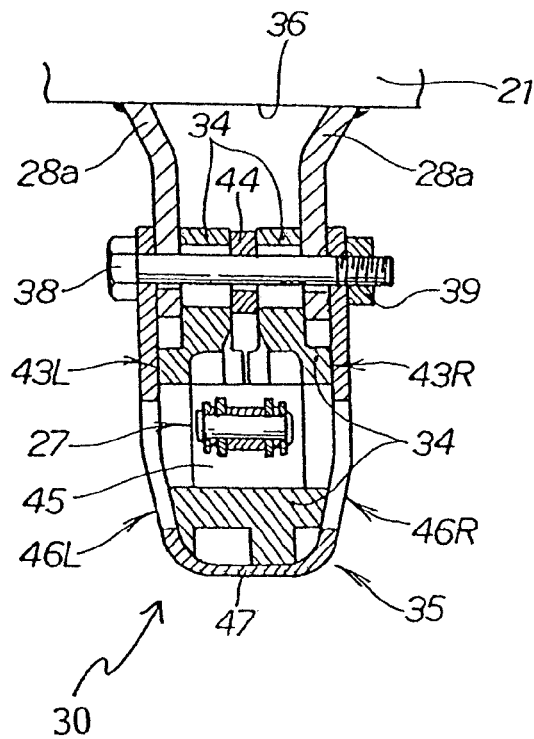
FIG. 3 is a cross-sectional view of the assembled chain guide, taken along the line 3-3 in FIG. 2.

FIG. 3 is a cross-sectional view of the chain guide hereof taken along the line 3-3 in FIG. 2. As seen in FIGS. 2-3, the chain guide 30 includes the chain guide member 34 attached to the mounting stay 28a, which is mounted to the lower surface 36 of the swing arm via the bolts 38 and the nuts 39. The chain guide 30 also includes the guide holder 35 attached to the mounting stay 28a via the bolt 38 and nut 39 while fitting around the outer surface 43L, 43R of the chain guide member 34. In the depicted embodiment, a collar 44 is fitted into the center of the chain guide member 34 via the bolt 38 and the nut 39.

The drawing also shows that the chain 27 is passed through an opening 45 formed at the center of the chain guide member 34.

The guide holder 35 is configured with a substantially U-shaped cross-section, as shown, wherein the lower ends of right and left walls 46L, 46R bend inwardly and are connected at the bottom portion 47, so that the left and right walls are downwardly tapered.

Since the guide holder 35 is configured with the left and right walls 46L, 46R tapered downwardly, the possibility of reception of impact from below or from the sides by, for example, stones or obstacles, may be reduced. As a consequence, the possibility of deformation and scarring of the guide holder 35 may be reduced.

In addition, the left and right walls 46L, 46R and the bottom portion 47 connecting the walls constituting the guide holder 35 are configured such that the bottom portion 47 is formed to be thinner than either of the left and right walls.

Since the guide holder 35 is formed from an extruded tubular member of substantially rectangular cross-sectional shape, the thickness of the bottom portion 47 can easily be made thinner than the thickness of either of the left and right walls 46L, 46R.

Consequently, by forming the left and right walls 46L, 46R of the guide holder 35, which corresponds to a mounting portion for the mounting stay 28a, thicker than the thickness of the bottom portion 47, and forming the bottom portion 47 thinner in relation thereto, the weight of the guide holder 35 can be reduced, while maintaining the strength of the left and right walls 46L, 46R.

FIG. 4 is an exploded perspective view of a chain guide 30 according to the present invention, and the chain guide 30 can be formed by fitting the guide holder 35 to the chain guide member 34 as indicated by an arrow a. The front of the chain guide 30 is shown on the left in the drawing.

As noted above, the integral enlarged flange 41 is provided at the front end of the chain guide member 34. The front end 42 of the guide holder 35 is provided with a cutout portion formed therein that receives the flange 41. The flange 41 is wider than the inside space between the side walls 46L, 46R, and therefore, the flange 41 blocks the guide holder 35 from moving therepast. As a result, the front end 42 of the guide holder is retained rearwardly of the flange 41, by bringing the front end 42 of the guide holder 35 in contact with the flange 41.

A guide member extension boss 37 is extended on top of the chain guide member 34, and the guide member extension boss is formed with guide member mounting holes 37a, 37b extending therethrough.

Additionally, the guide holder 35 is formed with guide holder mounting holes 40a, 40b, 40c formed through the upper portion thereof. The guide member mounting hole 37a is alignable with the guide holder mounting hole 40a, and the guide member mounting hole 37b is alignable with the guide holder mounting hole 40b, so as to be attachable to the mounting stay 28a via the bolt 38 and the nut 39 (See FIG. 3).

The guide holder mounting holes 40a, 40b are formed to be alignable with the holes of the mounting stay 28a (See FIG. 3), so that the guide holder can be attached to the mounting stay 28a via the bolt 38 and the nut 39. In the same manner, the guide holder mounting hole 40c is formed to be alignable with the hole on the mounting stay 28b (See FIG. 2), so as to be capable of being fixed to the mounting stay 28b via the bolt 38 and the nut 39.

The guide holder 35 is formed from an extruded tubular member made out of aluminum alloy. That is, only cutting and machining are needed to transform the tubular member into guide holders, and a pressing process is unnecessary. Since an extruded tubular member of aluminum alloy is used, the portion requiring machining is small, and simultaneously, a higher dimensional accuracy is achieved than if stamping or press processing is used.

Consequently, since the guide holder 35 can obtain higher dimensional accuracy than can be obtained by stamping or press processing, the chain guide member 34 can be accurately positioned and easily assembled with the guide holder 35.

FIG. 5 is a cross-sectional view of the chain guide hereof, taken along the line 5-5 in FIG. 2. FIG. 5 clearly shows that the integral enlarged flange 41 is provided at a front end of the chain guide member 34, and a front end 42 of the guide holder 35 is retained rearwardly of the flange 41 by bringing the front end 42 of the guide holder 35 in contact with the flange 41, as described above.

The integral flange 41 includes formed left and right back side surfaces 48L, 48R, and the back bottom surface 49 (see FIG. 2) clamped between the left and right back side surfaces 48L, 48R. Then, the chain guide 30 is formed by bringing the left and right walls 46L, 46R of the front end 42 of the guide holder 35 into abutment with the left and right back side surfaces 48L, 48R, and bringing the bottom portion 47 at the front end 42 of the guide holder 35 into abutment with the back bottom surface 49.

A method for manufacturing the guide holder will now be described, with reference to FIG. 6. FIG. 6 illustrates the manufacturing steps for forming a guide holder according to an aspect of the present invention.

The drawing (a) shows that the extruded tubular member 52, formed from an aluminum alloy and having a predetermined cross-sectional shape, is formed by an extruding die 51. In other words, the extruded tubular member 52 of the aluminum alloy is formed with a substantially rectangular cross-sectional shape with the left and right walls 46L, 46R tapered downwardly, and the thickness of the bottom portion 47 is made thinner than the thickness of either of the left and right walls 46L, 46R.

Since the guide holder is formed from the hollow extruded tubular member 52 of substantially rectangular cross-sectional shape, the packed state for transportation is stable in comparison with material of irregular cross-sectional shape, and thus the possibility of collapse of cargo piles can be reduced.

The drawing (b) shows that the extruded tubular member of aluminum alloy 52 can be divided lengthwise into two parts by a cutting tool 53, such as a revolving saw or other appropriate cutting tool.

Since the hollow extruded tubular member 52 of substantially rectangular cross-sectional shape can be formed into a pair of modified trough-shaped members, each having a substantially U-shaped cross-section by dividing the tubular member into two parts, the entire extruded member 52 can be utilized effectively.

Since the hollow extruded tubular member 52 of substantially rectangular cross-sectional shape is used by dividing a single member into two parts, the cross-sectional shape or the dimensional accuracy of the extruded member 52 can be effectively utilized as is, and a predetermined dimensional accuracy required for the guide holder 35 (See FIG. 2) can be secured easily and reliably.

Means for dividing the extruded tubular member 52 is not limited to the cutting tool described above. For example, it may be cut by a thermal processing means such as laser or welding.

FIG. 6(*c*) shows that the extruded tubular member 52, formed into substantially U-shape by dividing into two parts, can be processed to a predetermined shape by removing means such as cutting.

Since the extruded tubular member 52 is used, the portion requiring machining is small, and a higher dimensional accuracy is obtained than when a method of stamping or press processing is used.

By utilizing the extruded tubular member 52 of aluminum alloy, thermal processing which corresponds to T5 is performed simultaneously during the extruding process, and hence a strength equivalent to the high-strength aluminum alloy which is used in the guide holder in the related art is secured. Therefore, the only required post-process is machining, and hence a number of processes such as thermal processing, pressing, bending, solution annealing, aging treatment, precision alignment are not necessary. Since a die for a pressing process is not necessary, in particular, it is advantageous in terms of cost, particularly when manufacturing a few components.

Although the preferred removing means for processing the extruded tubular member 52, divided into two parts into a predetermined shape, is cutting, the method is not limited thereto. For example, it is also possible to process by thermal processing means such as laser or welding. An optimal method is selected by considering constraint conditions in manufacture such as processing accuracy, equipment held, or cycle time required for processing.

FIG. 6(*d*) shows a completed guide holder 35.

The operation of the chain guide thus constructed will be described below.

Referring again to FIG. 5, in the chain guide 30, the integral enlarged flange 41 is provided at a front end of the chain guide member 34, and the front end 42 of the guide holder 35 is retained rearwardly of the flange 41 by bringing the front end 42 of the guide holder 35 in contact with the flange 41.

Since it is constructed such that the flange 41 at the front end of the chain guide member 34 covers the front end of the guide holder, the chain 27 advances as indicated by an arrow b, and part of the chain 27 is adapted to be contacted by the moving chain guide member 34 due to external causes, so that a force is exerted on the flange 41 of the chain guide member 34 as indicated by an arrow b.

Since the flange 41 is applied against the leading edge 42 of the guide holder 35 with the force of arrow b, the chain guide member 34 is fixed to the guide holder 35 by the flange 41, the bolt 38 (see FIG. 3), and the nut 39. The chain guide member 34 is covered by the guide holder 35 along the outer surfaces 43L, 43R thereof, and the chain guide member 34 is prevented from coming off during normal use.

In the chain-introducing portion at the front of the chain guide 30, since the outside front edge of the guide holder 35 is substantially covered by the chain guide member 34, the chain 27 does not come into direct contact with the front end 42 of the guide holder 35. In other words, an impact due to contact of the chain 27 can be absorbed by the chain guide member 34. In addition, impact due to contact of the chain guide 30 with respect to the surface of the road during off-road travel can also be absorbed and alleviated by the chain guide member 34. Further, by using a resilient, abrasion-resistant material such as a polyurethane elastomer for forming the chain guide member 34, its impact absorbing property may be improved.

Consequently, scarring, deformation, and the like of the guide holder 35 can be reduced. Since scarring of the guide holder 35 is reduced, frequency of maintenance such as repair and/or replacement of the guide holder 35 may be reduced.

Although the material of the guide holder is extruded material of aluminum alloy in the described embodiment the present invention, iron, magnesium, titanium, or an alloy thereof are also usable, and may be substituted for the described alloy. Selection of the material is made considering required durability, strength, weight, dimensional accuracy, processability, and/or costs.

It is also possible to apply the chain guide of the present invention for a general vehicle having a chain and sprocket, for preventing the chain from coming apart.

Also, the chain guide of the invention can be widely applied to a motorcycle, a tricycle, and to chain-driven utility vehicles.

While a working example of the present invention has been described, the present invention is not limited to the working example described above but can be modified in various manners without departing from the spirit and scope of the present invention, as set forth in the claims.

Having thus described the invention, what is claimed is:

1. A chain guide for a chain-driven motorcycle having a frame, a rear swing arm pivotally attached to the frame, a rear wheel rotatably attached to the swing arm and having a sprocket thereon, and a drive chain mounted on the sprocket, said chain guide comprising:

a chain guide member adapted to be contacted by the chain during movement thereof, said chain guide member comprising a medial portion having a first width and a front end portion forward of the medial portion and comprising an enlarged flange, said flange extending substantially transversely outwardly from the medial portion and being wider than the medial portion on both sides thereof; and a guide holder for supportively holding the chain guide member therein, the guide holder mounted to a lower portion of the swing arm of the motorcycle;

wherein the width of the chain guide member at the flange provides a stop member to limit rearward movement of the chain guide member in the guide holder and to retain a front end portion of the guide holder rearwardly thereof, and wherein said front end portion of the guide holder abuttingly contacts the flange of the chain guide member in an installed configuration of the chain guide, and wherein the chain guide is oriented such that during operation of said motorcycle, the chain is introduced into the front end portion of the chain guide member.

2. A chain guide according to claim 1, characterized in that the guide holder is made in a modified trough shape provided with left and right walls, with lower ends of the left and right walls bending inwardly in a non-parallel configuration and being connected by a bottom portion of the guide holder, to provide a substantially U-shaped cross-section with the lower ends of the left and right walls tapered downwardly.

3. A chain guide according to claim 2, characterized in that the guide holder is formed from an extruded tubular member made of an aluminum alloy.

4. A chain guide according to claim 3, characterized in that the extruded tubular member has a hollow substantially rectangular cross-sectional shape, and wherein the guide holder is formed substantially into a cross-sectional U-shape by dividing the extruded tubular member into two parts.

5. A chain guide according to claim 3, wherein the left and right walls and the bottom portion of the guide holder are configured such that the bottom portion is thinner than either of the left and right walls.

6. A chain guide according to claim 2, wherein the left and right walls and the bottom portion of the guide holder are configured such that the bottom portion is thinner than either of the left and right walls.

7. A chain guide according to claim 1, wherein the guide holder comprises left and right walls and a bottom portion interconnecting the walls, characterized in that the left and right walls and the bottom portion connecting the walls of the guide holder are configured such that the bottom portion is thinner than either of the left and right walls.

8. A chain guide according to claim 1, wherein the guide holder has a cutout portion formed in a chain-receiving end thereof to receive the flange of the chain guide member, wherein the width of the flange blocks the guide holder from moving past the chain guide member, and wherein the flange at the front end of the chain guide member is adapted to shield the front end of the guide holder from contact with a drive chain.

9. The chain guide of claim 1, wherein the flange is an integrally formed part of the chain guide member.

10. The chain guide of claim 1, wherein the chain guide member is formed from a material comprising a polyurethane elastomer.

11. A chain guide according to claim 1, wherein the chain guide member is formed of a flexibly resilient material.

12. A chain guide for a chain-driven motorcycle having a frame, a rear swing arm pivotally attached to the frame, a rear wheel rotatably attached to the swing arm and having a sprocket thereon, and a drive chain mounted on the sprocket, said chain drive comprising:
  a chain guide member adapted to contact the chain during movement thereof, said chain guide member comprising a medial portion having a first width and a front end portion forward of the medial portion and comprising an integral enlarged flange, said flange extending substantially transversely outwardly from the medial portion and being wider than the medial portion on both sides thereof; and
  a guide holder for holding the chain guide member; the guide holder adapted to be mounted to a lower portion of the swing arm of the motorcycle and oriented such that during operation of said motorcycle, the chain is introduced into the front end portion of the chain guide,
  wherein the guide holder is formed with a substantially U-shaped cross-sectional shape by dividing an extruded tubular member into two parts, and wherein the guide holder includes a front end portion which abuttingly contacts the flange of the chain guide member in an installed configuration of the chain guide.

13. A chain guide according to claim 12, characterized in that the guide holder is formed from an aluminum alloy.

14. A chain guide according to claim 13, characterized in that the extruded tubular member is formed with a hollow, substantially rectangular cross-sectional shape.

15. A chain guide according to claim 12, wherein the guide holder comprises left and right walls and a bottom portion interconnecting the walls, characterized in that the left and right walls and the bottom portion connecting the walls of the guide holder are configured such that the bottom portion is thinner than either of the left and right walls.

16. A chain guide according to claim 12, wherein the integral enlarged flange is disposed at a forward chain-receiving end of the chain guide member.

17. The chain guide according to claim 16, wherein the guide holder has a cutout portion formed in a chain-receiving end thereof to receive the flange of the chain guide member, wherein the width of the flange blocks the guide holder from moving past the chain guide member, and wherein the flange at the front end of the chain guide member is adapted to shield the front end of the guide holder from contact with a drive chain.

18. A chain guide according to claim 12, wherein the chain guide member is formed of a flexibly resilient material.

19. A chain guide for a chain-driven driven motorcycle having a frame, a rear swing arm pivotally attached to the frame, a rear wheel rotatably attached to the swing arm and having a sprocket thereon, and a drive chain mounted on the sprocket, said chain guide comprising:
  a chain guide member adapted to be contacted by the chain during movement thereof, said chain guide member comprising a medial portion having a first width and a front end portion forward of the medial portion and comprising an enlarged flange, said flange extending substantially transversely outwardly from the medial portion and being wider than the medial portion on both sides thereof; and
  a guide holder for supportively holding the chain guide member therein, the guide holder mounted to a lower portion of the swing arm of the motorcycle so as to extend downwardly therefrom;
  wherein the width of the chain guide member at the flange provides a stop member to limit rearward movement of the chain guide member in the guide holder and to retain a front end portion of the guide holder rearwardly thereof;
  wherein said front end portion of the guide holder abuttingly contacts the flange of the chain guide member in an installed configuration of the chain guide;
  wherein the guide holder has a cutout portion formed in a chain-receiving end thereof to receive the flange of the chain guide member;
  wherein the flange at the front end of the chain guide member is adapted to shield the front end of the guide holder from contact with a drive chain, and
  wherein the chain guide is oriented such that during operation of said motorcycle, the chain is introduced into the front end portion of the chain guide member.

20. A chain guide according to claim 19, characterized in that the guide holder is made in a modified trough shape provided with left and right walls, with lower ends of the left and right walls bending inwardly in a non-parallel configuration and being connected by a bottom portion of the guide holder, to provide a substantially U-shaped cross-section with the lower ends of the left and right walls tapered downwardly.

21. A chain guide according to claim 20, wherein the left and right walls and the bottom portion of the guide holder are configured such that the bottom portion is thinner than either of the left and right walls.

22. A chain guide according to claim 19, wherein the chain guide member is formed from a material comprising a polyurethane elastomer.

23. A chain guide according to claim 19, wherein the chain guide member is formed of a flexibly resilient material.

* * * * *